(12) United States Patent
Xu et al.

(10) Patent No.: US 12,389,829 B2
(45) Date of Patent: Aug. 19, 2025

(54) CYLINDRICAL COORDINATE SHEARING TYPE FRUIT PICKING END EFFECTOR

(71) Applicant: Sichuan Agricultural University, Chengdu (CN)

(72) Inventors: Lijia Xu, Chengdu (CN); Leilei Tang, Chengdu (CN); Zuoliang Tang, Chengdu (CN); Long Zhou, Chengdu (CN); Qinmao Yang, Chengdu (CN); Yuchao Wang, Chengdu (CN); Zhijun Wu, Chengdu (CN); Yongpeng Zhao, Chengdu (CN); Xiaoshi Shi, Chengdu (CN); Zhiliang Kang, Chengdu (CN)

(73) Assignee: Sichuan Agricultural University, Chengdu (CN)

( * ) Notice: Subject to any disclaimer, the term of this patent is extended or adjusted under 35 U.S.C. 154(b) by 203 days.

(21) Appl. No.: 18/375,583

(22) Filed: Oct. 2, 2023

(65) Prior Publication Data
US 2025/0108514 A1    Apr. 3, 2025

(51) Int. Cl.
*A01D 46/24* (2006.01)
*A01D 46/253* (2006.01)
(Continued)

(52) U.S. Cl.
CPC ........... *A01D 46/24* (2013.01); *A01D 46/253* (2013.01); *A01D 46/30* (2013.01); *B25J 9/1697* (2013.01); *B25J 11/0045* (2013.01)

(58) Field of Classification Search
CPC . Y10T 83/05; Y10T 83/6657; Y10T 83/6656; Y10T 83/141; Y10T 83/145; Y10T 83/202; Y10T 83/2092; Y10T 83/5669; Y10T 83/748; Y10T 83/7487; Y10T 83/768; Y10T 83/8821; Y10T 83/929; B25J 9/1697; B25J 11/0045; A01D 46/00; A01D 46/24; A01D 46/247; A01D 46/253; A01D 46/30; A01D 47/00; A47J 21/00

See application file for complete search history.

(56) References Cited

U.S. PATENT DOCUMENTS

2023/0060138 A1*  3/2023  Shimomura ........... A01D 46/24
2023/0068237 A1*  3/2023  Knopf ....................... B25J 15/10
(Continued)

*Primary Examiner* — Phong H Nguyen
(74) *Attorney, Agent, or Firm* — Bayramoglu Law Offices LLC

(57) ABSTRACT

A cylindrical coordinate shearing type fruit picking end effector and a use method therefor are provided. The cylindrical coordinate shearing type fruit picking end effector includes a rack, a fruit clamping mechanism, a rotary motion mechanism, a rotary angle detection mechanism, a linear motion mechanism, a shearing motion mechanism, and a linear distance detection mechanism; where the linear distance detection mechanism is arranged at a front end of the linear motion mechanism; the shearing motion mechanism is arranged at a rear end of the shearing motion mechanism; the linear motion mechanism is arranged at a top end of the rotary motion mechanism; the rotary motion mechanism is arranged at a rear end of the rack; the rotary angle detection mechanism is arranged at a front end of the rotary motion mechanism; and the fruit clamping mechanism is arranged at a front end of the rack.

18 Claims, 5 Drawing Sheets

(51) Int. Cl.
*A01D 46/30* (2006.01)
*B25J 9/16* (2006.01)
*B25J 11/00* (2006.01)

(56) References Cited

U.S. PATENT DOCUMENTS

2023/0189712 A1* 6/2023 Yokoue .................. A01D 46/24
  56/328.1
2024/0373787 A1* 11/2024 Robertson .............. A01D 46/30

* cited by examiner

CYLINDRICAL COORDINATE SHEARING TYPE FRUIT PICKING END EFFECTOR

TECHNICAL FIELD

The present invention belongs to the field of agricultural picking equipment, and particularly relates to a cylindrical coordinate shearing type fruit picking end effector and a use method therefor.

BACKGROUND

At present, the cost of manual labor is increasing and becoming unstable, and the supply of agricultural labor is facing a shortage. This has prompted the agricultural industry to seek automated techniques to reduce reliance on human resources and to reduce picking costs. Meanwhile, as the global population grows and the demand for fruits increases, agricultural production needs to improve efficiency and yield to meet market demand. In recent years, the fields of robot technology, visual identification, machine learning, automatic control, and the like are rapidly developed, and more innovation and application possibilities are provided for the research of a fruit picking end effector, so that the automatic picking technology can achieve a faster and more continuous picking process, and production efficiency and yield are improved. At present, the key problem of automatic fruit picking is how to accurately identify and precisely position fruits and fruit stalks in a complex unstructured environment and achieve automatic undamaged picking.

SUMMARY

An objective of the present invention is to provide a cylindrical coordinate shearing type fruit picking end effector and a use method therefor, thereby solving the defects in the conventional technology.

In order to achieve the foregoing objective, the present invention adopts the following technical solutions.

A cylindrical coordinate shearing type fruit picking end effector includes: a rack, a fruit clamping mechanism, a rotary motion mechanism, a rotary angle detection mechanism, a linear motion mechanism, a shearing motion mechanism, and a linear distance detection mechanism;

the linear distance detection mechanism is arranged at a front end of the linear motion mechanism and is configured to detect a position between the shearing motion mechanism and a fruit stalk;

the shearing motion mechanism is arranged at a rear end of the shearing motion mechanism and is configured to shear a fruit stalk;

the linear motion mechanism is arranged at a top end of the rotary motion mechanism and is configured to adjust a distance between the shearing motion mechanism and a fruit stalk;

the rotary motion mechanism is arranged at a rear end of the rack and is configured to adjust an angle of the shearing motion mechanism;

the rotary angle detection mechanism is arranged at a front end of the rotary motion mechanism and is configured to detect an angle of a fruit stalk; and the fruit clamping mechanism is arranged at a front end of the rack and is configured to clamp and fix a position of a fruit.

Preferably, fruit protection fingers are further arranged at two sides that are of the rack and that are close to a rear end of the fruit clamping mechanism, and the fruit protection fingers are configured to avoid difficult clamping caused by fruit overlapping.

Preferably, the fruit clamping mechanism includes: a clamping motor, a clamping motor fixing seat, a finger coupler, a finger clamping nut, a bidirectional screw, a clamping bearing seat, a flexible finger, an optical axis fixing seat, a finger guide block, and a guide optical axis; the clamping motor is fixedly connected to the rack by the clamping motor fixing seat, the bidirectional screw is in transmission connection with an output shaft of the clamping motor by the finger coupler, the other end of the bidirectional screw is rotatably connected to the clamping bearing seat, two finger clamping nuts are symmetrically screwed at two ends of the bidirectional screw, the flexible finger is fixed at a front end of the finger clamping nut, the optical axis fixing seat is fixed at a bottom end of the rack, and the finger clamping nut is connected to the guide optical axis in a sliding mode by the finger guide block.

Preferably, the flexible finger is provided with a thin-film pressure sensor, and the thin-film pressure sensor is configured to ensure undamaged fruit picking.

Preferably, the rotary motion mechanism includes: a rotary motion motor, a rotary motor fixing seat, a rotary coupler, a swing rod, a rotary shaft, an arc-shaped guide rail fixing seat, an arc-shaped guide rail, a rotary motion bearing seat, a rolling shaft, a roller bearing, a swing connecting rod, and a rotary platform; the rotary motion motor is connected to the rack by the rotary motor fixing seat, the rotary shaft is connected to an output shaft of the rotary motion motor by the rotary coupler, the other end of the rotary shaft is connected to the rotary motion bearing seat, the swing rod is arranged at one end that is of the rotary shaft and that is close to the rotary coupler, the swing connecting rod is connected to the swing rod in a sliding manner, the rotary platform is fixed on the swing connecting rod, the arc-shaped guide rail is connected to the rack by the arc-shaped guide rail fixing seat, and the rotary platform is movably connected onto the arc-shaped guide rail by the rolling shaft provided with the roller bearing.

Preferably, the rotary angle detection mechanism is installed in front of the rotary motion bearing seat, the rotary angle detection mechanism includes: a rotation detection connecting block, an angle detection rod, and an angle limit switch, the rotation detection connecting block is fixedly connected to the rotary shaft, the rotation detection connecting block and the angle detection rod are both provided with linear grooves for fixing a torsion spring, and the angle limit switch is installed on the rotation detection connecting block.

Preferably, the linear motion mechanism is installed on a rotary platform, the linear motion mechanism includes: a linear motion motor, a linear motion motor fixing seat, a linear motion guide rail, a linear motion nut, a linear push rod, a linear motion platform, a linear motion sliding block, and a linear motion bearing seat, the linear motion motor is installed on the rotary platform by a linear motion motor fixing seat, a first screw rod is connected to an output shaft of the linear motion motor, the other end of the first screw rod is connected to the linear motion bearing seat, the linear motion nut is in threaded connection with the first screw rod, the linear push rod is connected to the linear motion nut by a bolt, the linear motion guide rail is installed in a middle portion of the rotary platform, and the linear motion platform is slidably installed on the linear motion guide rail by the linear motion sliding block.

Preferably, the shearing motion mechanism is installed at a rear end of the linear motion platform, the shearing motion mechanism includes: a shearing motion motor, a shearing motion guide rod, a shearing motion sliding block, a shearing motion bearing seat, and a boosting shearing mechanism, the shearing motion motor is installed on the linear motion platform, a second screw rod is connected to an output shaft of the shearing motion motor, the shearing motion sliding block is in threaded connection with the second screw rod, the shearing motion bearing seat is connected to the other end of the second screw rod, the shearing motion guide rod is installed on two sides of the second screw rod, and the shearing motion sliding block is connected to the shearing motion guide rods at two sides in a sliding manner; and the boosting shearing mechanism includes: a first connecting rod, a second connecting rod, a third connecting rod, a fixed blade, a movable blade, a movable blade sliding block, a movable blade guide rail, and a connecting rod fixing column, one end of the first connecting rod is hinged to the shearing motion sliding block, the other end of the first connecting rod is hinged to the second connecting rod, the other end of the second connecting rod is hinged to the connecting rod fixing column, the connecting rod fixing column is installed on the linear motion platform, a middle portion of the second connecting rod is hinged to the third connecting rod, the other end of the third connecting rod is hinged to the movable blade, the fixed blade is installed at a position that is at the forefront of the linear motion platform and that is close to a fruit, the movable blade guide rail is transversely installed at a front end of the linear motion platform, and the movable blade is connected to the movable blade guide rail in a sliding manner by the movable blade sliding block.

Preferably, the linear distance detection mechanism is arranged in front of the linear motion platform and close to a direction of a fruit, the linear distance detection mechanism includes: a distance detection push rod, a linear detection fixing seat, and a distance limit switch, the distance detection push rod is arranged below the fixed blade and is connected to the linear detection fixing seat, a cylindrical guide rod and a compression spring are arranged on the distance detection push rod, the distance detection push rod can move linearly along the cylindrical guide rod, the linear detection fixing seat is arranged on the linear motion platform and is positioned between the distance detection push rod and the shearing motion bearing seat, and the distance limit switch is arranged on the linear detection fixing seat and is installed at a position of the cylindrical guide rod on the distance detection push rod.

A use method for the cylindrical coordinate shearing type fruit picking end effector according to any one of the foregoing aspects includes the following steps:

S1: the picking end effector is debugged to an initial state;

S2: when a position of a fruit is known, a mechanical arm moves to enable the picking end effector to reach a position near a to-be-picked fruit, and the fruit protection finger separates the to-be-picked fruit from other overlapped fruits, so that interference of other fruits and fruit stalks on mechanical detection is avoided; the clamping motor rotates, the flexible finger linearly moves along the guide optical axis along with the finger clamping nut and the finger guide block, and a rotation direction of the clamping motor should enable a distance of the flexible finger to close; when the flexible finger touches a surface of the fruit, a pressure value is generated on the thin-film pressure sensor on the flexible finger, the pressure value of the thin-film pressure sensor reaches a safety threshold value as the distance of the flexible finger is further shortened, and in this case, the clamping motor stops rotating, and the fruit clamping action is completed;

S3: when a position of a fruit stalk cannot be identified visually due to the blocking of fruits and leaves, operations of the rotary angle detection mechanism and the linear distance detection mechanism are required, after the fruit clamping is completed, the rotary motion motor rotates from left to right, the rotary platform and the rotary motion motor coaxially rotate along the arc-shaped guide rail, and when the fruit stalk is touched, and the angle detection rod rotates in a direction opposite to a rotation direction of the rotary motion motor due to the compression of a torsion spring under the action of a contact force, so that the angle limit switch is triggered, the rotary motion motor stops moving, and the angle detection of the fruit stalk is completed;

when the angle detection is completed, the linear motion motor rotates to drive the linear push rod to push the linear motion platform to move linearly towards a fruit motion direction along the linear motion guide rail; when the distance detection push rod touches the fruit stalk, the distance detection push rod compresses a compression spring under the action of a contact force, and thus the distance detection push rod moves towards an opposite direction of the fruit along the cylindrical guide rod on the distance detection push rod, so that the distance limit switch is triggered, the linear motion motor stops moving, and the distance detection of the fruit stalk is completed;

S4: when the cylindrical coordinate fruit stalk positioning based on the rotary angle and the linear distance detection is completed, the rotary platform and the linear motion platform reach a to-be-sheared position; in this case, the shearing motion motor rotates to drive the shearing motion sliding block to move linearly towards the fruit direction along the shearing motion guide rod; the second connecting rod in the boosting shearing mechanism pushes the movable blade to move linearly towards a closing direction of the blade along the movable blade guide rail, so that the shearing of the fruit stalk is completed; and S5: when the shearing of the fruit stalk is completed, the picking end effector moves to a position of a fruit basket by the mechanical arm, and the clamping motor rotates, so that the flexible finger is opened, a fruit is released, and the undamaged fruit picking is completed.

Compared with the conventional technology, the cylindrical coordinate shearing type fruit picking end effector and the use method therefor provided by the present invention have the following advantages.

By combining machine vision and mechanical detection methods, the present invention can control the end effector based on the actual fruit stalk identification, solves the problem that the fruit stalk is seriously blocked and cannot be identified and positioned, improves the success rate of fruit stalk identification and the success rate of picking; and meanwhile, by using the flexible finger to clamp, the present invention ensures that the fruit is not damaged in the automatic picking process.

Specifically:

1. According to the cylindrical coordinate shearing type fruit picking end effector and the use method therefor of the present invention, a fruit stalk positioning method is provided based on cylindrical coordinates, and can be applied to two positioning modes of machine vision and mechanical detection; especially in a case that the machine vision cannot be used for identifying, the success rate of fruit stalk identification and positioning can be improved by combining mechanical detection and positioning, and the application is flexible.

2. The cylindrical coordinate shearing type fruit picking end effector of the present invention is provided with a design of a boosting shearing mechanism, and can drive the blade to complete the shearing of the fruit stalks by using power with lower power for fruits with serious fruit stalk lignification, so that the shearing stability and success rate are improved, and the volume of the whole shearing mechanism is reduced.

3. The cylindrical coordinate shearing type fruit picking end effector of the present invention is provided with a flexible clamping mechanism, the clamping mechanism is simple in structure, and the undamaged fruit picking can be implemented through the feedback control of the thin-film pressure sensor.

BRIEF DESCRIPTION OF THE DRAWINGS

In order to more clearly illustrate the technical solutions in the embodiments of the present invention or in the prior art, the drawings required to be used in the description of the embodiments or the prior art are briefly introduced below. It is obvious that the drawings in the description below are merely embodiments of the present invention, and those of ordinary skill in the art can obtain other drawings according to the drawings provided without creative efforts.

Figure 1:
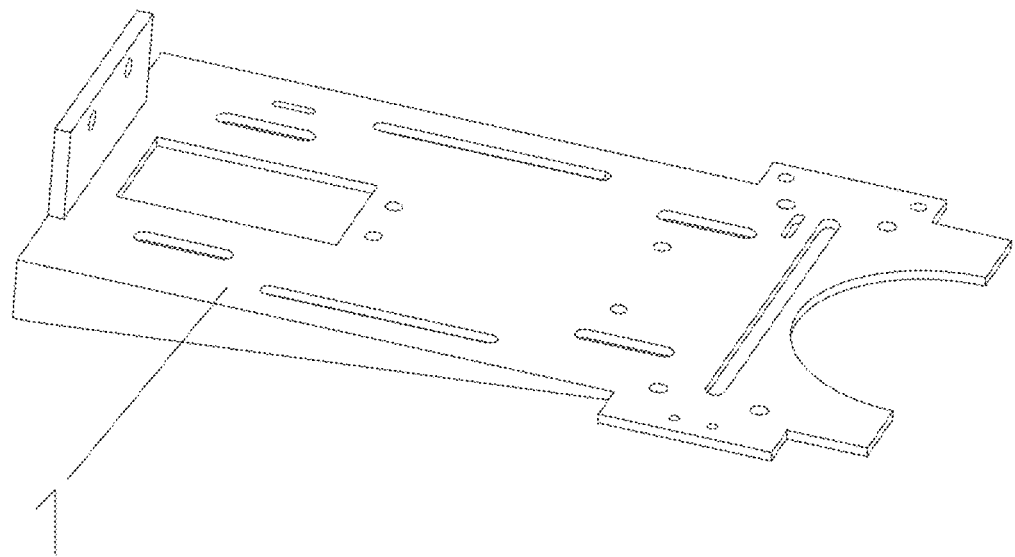
FIG. 1 is a schematic diagram of a structure of a rack according to the present invention.

In the drawings, 1: rack, 201: clamping motor, 202: clamping motor fixing seat, 203: finger coupler, 204: finger clamping nut, 205: bidirectional screw, 206: clamping bearing seat, 207: flexible finger, 208: optical axis fixing seat, 209: finger guide block, 210: guide optical axis, 301: rotary motion motor, 302: rotary motor fixing seat, 303: rotary coupler, 304: swing rod, 305: rotary shaft, 306: arc-shaped guide rail fixing seat, 307: arc-shaped guide rail, 308: rotary motion bearing seat, 309: rolling shaft, 310: roller bearing, 311: swing connecting rod, 312: rotary platform, 401: rotation detection connecting block, 402: angle detection rod, 403: angle limit switch, 5: fruit protection finger, 601: linear motion motor, 602: linear motion motor fixing seat, 603: linear motion guide rail, 604: linear motion nut, 605: linear push rod, 606: linear motion platform, 607: linear motion sliding block, 608: linear motion bearing seat, 701: shearing motion motor, 702: shearing motion guide rod, 703: shearing motion sliding block, 704: first connecting rod, 705: second connecting rod, 706: third connecting rod, 707: shearing motion bearing seat, 708: fixed blade, 709: movable blade, 710: movable blade sliding block, 711: movable blade guide rail, 712: connecting rod fixing column, 801: distance detection push rod, 802: linear detection fixing seat, and 803: distance limit switch.

DETAILED DESCRIPTION OF THE EMBODIMENTS

The technical solutions of the present invention are further described below with reference to the accompanying drawings and the embodiments.

Embodiment 1

Figure 2:
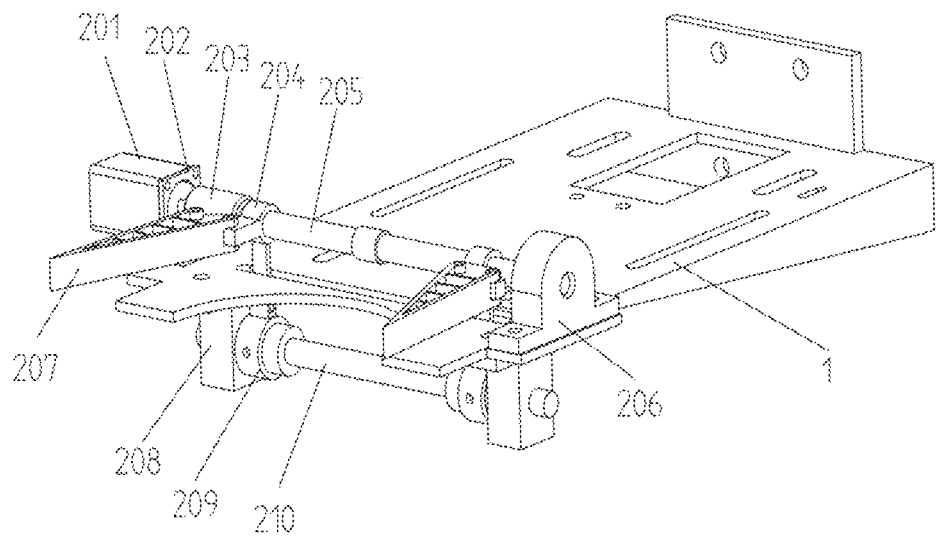
FIG. 2 is a schematic diagram of a structure of a fruit clamping mechanism according to the present invention.
Figure 3:
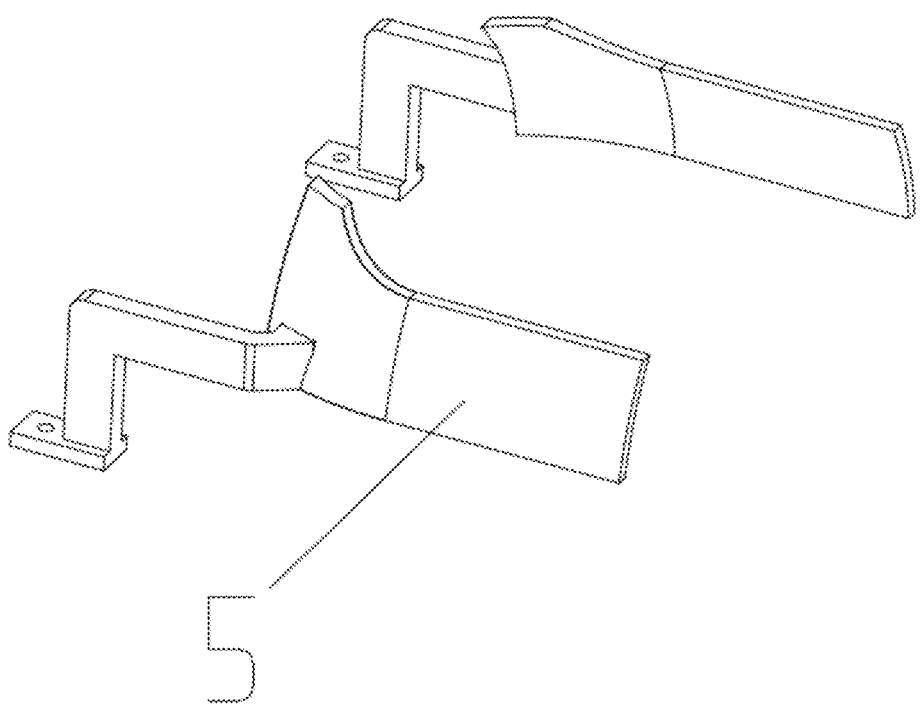
FIG. 3 is a schematic diagram of a structure of a fruit protection finger according to the present invention.

Referring to FIGS. 1 to 3, the present invention provides a cylindrical coordinate shearing type fruit picking end effector, which includes: a rack 1, a fruit clamping mechanism, a rotary motion mechanism, a rotary angle detection mechanism, a linear motion mechanism, a shearing motion mechanism, and a linear distance detection mechanism;

the linear distance detection mechanism is arranged at a front end of the linear motion mechanism and is configured to detect a position between the shearing motion mechanism and a fruit stalk;

the shearing motion mechanism is arranged at a rear end of the shearing motion mechanism and is configured to shear a fruit stalk;

the linear motion mechanism is arranged at a top end of the rotary motion mechanism and is configured to adjust a distance between the shearing motion mechanism and a fruit stalk;

the rotary motion mechanism is arranged at a rear end of the rack 1 and is configured to adjust an angle of the shearing motion mechanism;

the rotary angle detection mechanism is arranged at a front end of the rotary motion mechanism and is configured to detect an angle of a fruit stalk; and the fruit clamping mechanism is arranged at a front end of the rack 1 and is configured to clamp and fix a position of a fruit.

As a preferred embodiment, fruit protection fingers 5 are further arranged at two sides that are of the rack 1 and that are close to a rear end of the fruit clamping mechanism, and the fruit protection fingers 5 are configured to avoid difficult clamping caused by fruit overlapping.

The fruit clamping mechanism includes: a clamping motor 201, a clamping motor fixing seat 202, a finger coupler 203, a finger clamping nut 204, a bidirectional screw 205, a clamping bearing seat 206, a flexible finger 207, an optical axis fixing seat 208, a finger guide block 209, and a guide optical axis 210; the clamping motor 201 is fixedly connected to the rack 1 by the clamping motor fixing seat 202, the bidirectional screw 205 is in transmission connection with an output shaft of the clamping motor 201 by the finger coupler 203, the other end of the bidirectional screw 205 is rotatably connected to the clamping bearing seat 206, two finger clamping nuts 204 are symmetrically screwed at two ends of the bidirectional screw 205, the flexible finger 207 is fixed at a front end of the finger clamping nut 204, the optical axis fixing seat 208 is fixed at a bottom end of the rack 1, and the finger clamping nut 204 is connected to the guide optical axis 210 in a sliding mode by the finger guide block 209. Further, two ends of the bidirectional screw 205 have threads with different rotation directions, one end is left-handed and the other end is right-handed, and the two finger clamping nuts 204 are in a bilateral symmetry structure and are respectively provided with left-handed and right-handed threads in the cylindrical hole, so that the two finger clamping nuts 204 are in opposite motion directions when the bidirectional screw 205 rotates.

In a preferred embodiment, the flexible finger 207 is provided with a thin-film pressure sensor, and the thin-film pressure sensor is configured to ensure undamaged fruit picking.

Figure 4:
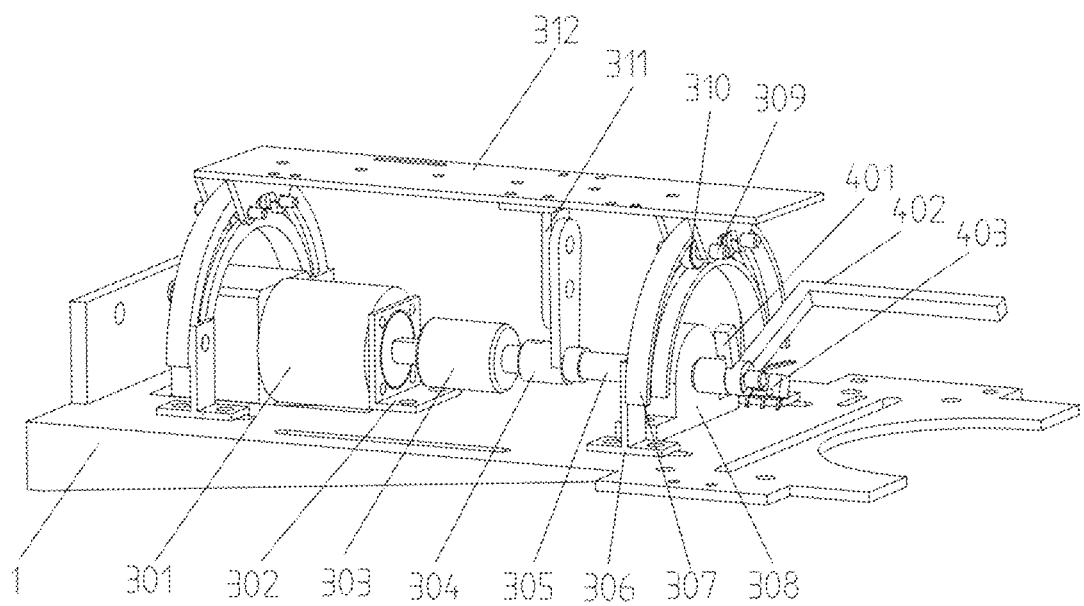
FIG. 4 is a schematic diagram of structures of a rotary motion mechanism and a rotary angle detection mechanism according to the present invention.
Figure 5:
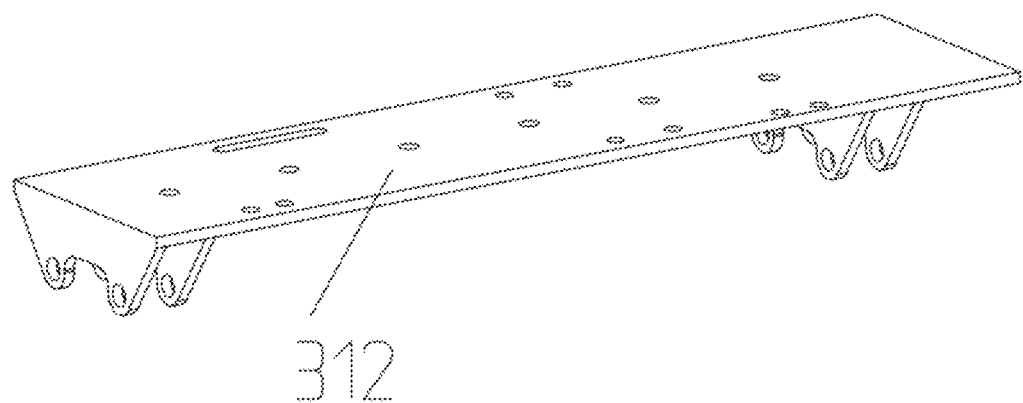
FIG. 5 is a schematic diagram of a structure of a rotary platform according to the present invention.

Referring to FIGS. 4 to 5, the rotary motion mechanism includes: a rotary motion motor 301, a rotary motor fixing seat 302, a rotary coupler 303, a swing rod 304, a rotary shaft 305, an arc-shaped guide rail fixing seat 306, an arc-shaped guide rail 307, a rotary motion bearing seat 308, a rolling shaft 309, a roller bearing 310, a swing connecting rod 311, and a rotary platform 312; the rotary motion motor 301 is connected to the rack 1 by the rotary motor fixing seat 302, the rotary shaft 305 is connected to an output shaft of the rotary motion motor 301 by the rotary coupler 303, the other end of the rotary shaft 305 is connected to the rotary motion bearing seat 308, the swing rod 304 is arranged at one end that is of the rotary shaft 305 and that is close to the rotary coupler 303, the swing connecting rod 311 is connected to the swing rod 304 in a sliding manner, the rotary platform 312 is fixed on the swing connecting rod 311, the arc-shaped guide rail 307 is connected to the rack 1 by the arc-shaped guide rail fixing seat 306, and the rotary platform 312 is movably connected onto the arc-shaped guide rail 307 by the rolling shaft 309 provided with the roller bearing 310.

The vertical planes at two ends of the rotary platform 312 are provided with four through holes, the rotary platform is supported on the arc-shaped guide rail 307 by four rolling shafts 309, when the rotary motion motor 301 rotates, the rotary platform 312 is driven by the swing rod 304 and limited by the arc-shaped guide rail 307, and the rotary platform 312 can synchronously rotate along with the rotary motion motor 301; meanwhile, the waist-shaped hole formed by connecting the swing connecting rod 311 and the swing rod 304 can compensate the rotation center inconsistency and the influence of the processing error of the arc-shaped groove on the arc-shaped guide rail 307 on the rotary motion, and the rotary platform 312 can smoothly complete the left-right rotary motion along the arc-shaped guide rail 307. In a case that the angle of fruit stalks cannot be obtained through machine vision identification due to severe blocking, the rotary platform 312 needs to cooperate with the rotary angle detection mechanism to reach a specified position; in a case that the angle of fruit stalks can be obtained through machine vision, the controller directly drives the rotary motion motor 301 to rotate the specified angle, so that the rotary platform 312 reaches a specified position.

Referring to FIG. 4, the rotary angle detection mechanism is installed in front of the rotary motion bearing seat 308, the rotary angle detection mechanism includes: a rotation detection connecting block 401, an angle detection rod 402, and an angle limit switch 403, the rotation detection connecting block 401 is fixedly connected to the rotary shaft 305, the rotation detection connecting block 401 and the angle detection rod 402 are both provided with linear grooves for fixing a torsion spring, and the angle limit switch 403 is installed on the rotation detection connecting block 401. When the rotary angle detection mechanism detects the angle of the fruit stalk, the rotary angle detection mechanism can synchronously rotate along with the rotation shaft 305 of the rotary motion mechanism, and meanwhile, the rotary platform also rotates along with the rotation shaft 305 by the same angle; when the angle detection rod 402 does not touch the fruit stalk in the rotation process, the angle detection rod can rotate along with the rotation detection connecting block 401 under the elastic force action of a torsion spring; when the angle detection rod touches the fruit stalk, the fruit cannot significantly move under certain acting force because the fruit is clamped by the fruit clamping mechanism, and in this case, the fruit stalk can generate a reacting force for the angle detection rod 402 to enable the angle detection rod 402 to rotate in a direction opposite to a rotation direction of the rotation shaft 305, and then can touch the angle limit switch 403, so that the rotary motion motor 301 stops rotating, and mechanical detection of the angle value in the cylindrical coordinate of the fruit stalk is completed.

Figure 6:
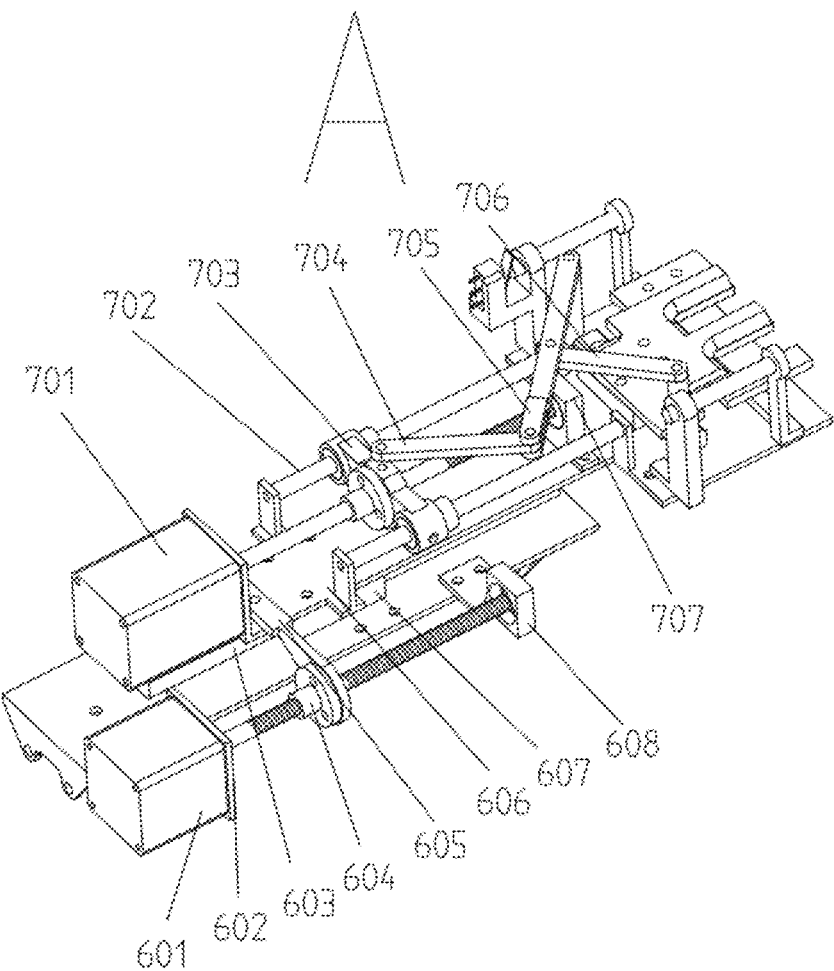
FIG. 6 is a schematic diagram A of structures of a linear motion mechanism, a shearing motion mechanism, and a linear distance detection mechanism according to the present invention.
Figure 7:
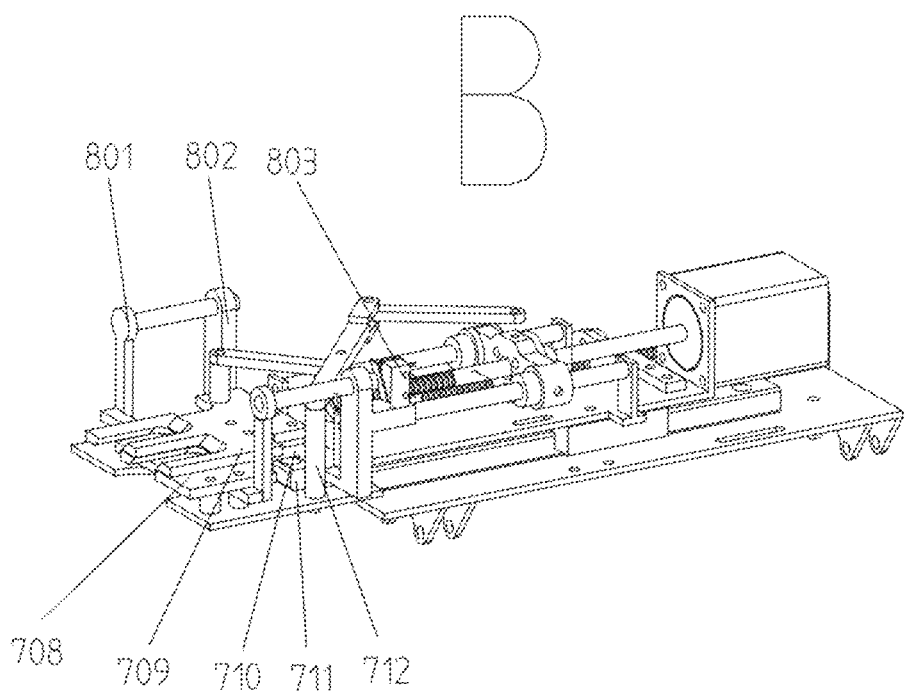
FIG. 7 is a schematic diagram B of structures of a linear motion mechanism, a shearing motion mechanism, and a linear distance detection mechanism according to the present invention.
Figure 8:
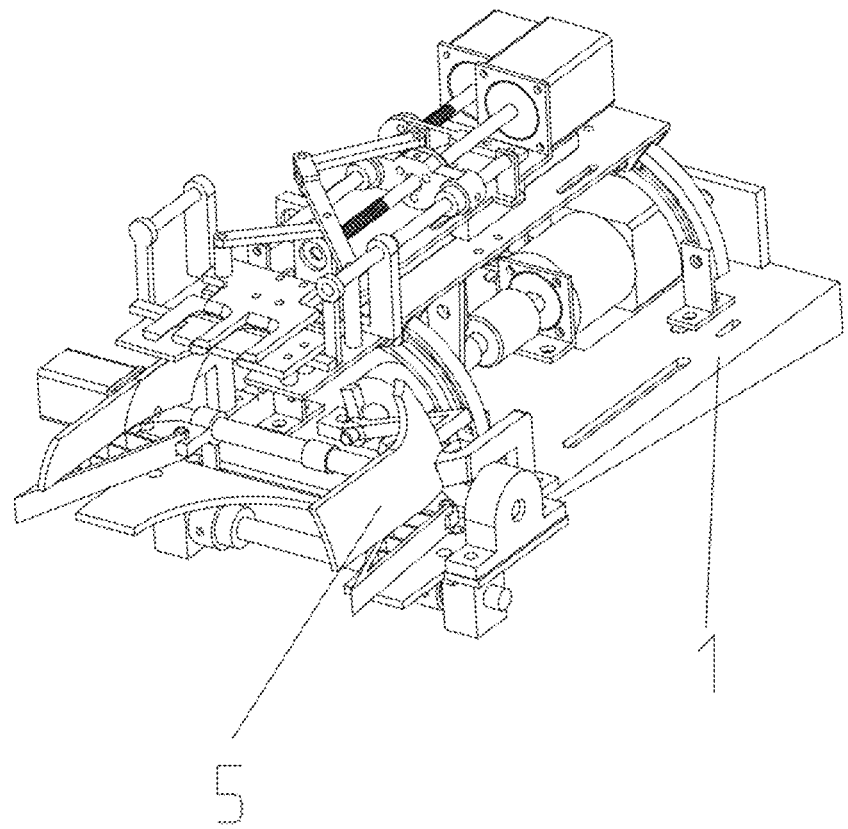
FIG. 8 is a schematic diagram of an overall structure according to the present invention.
Figure 9:
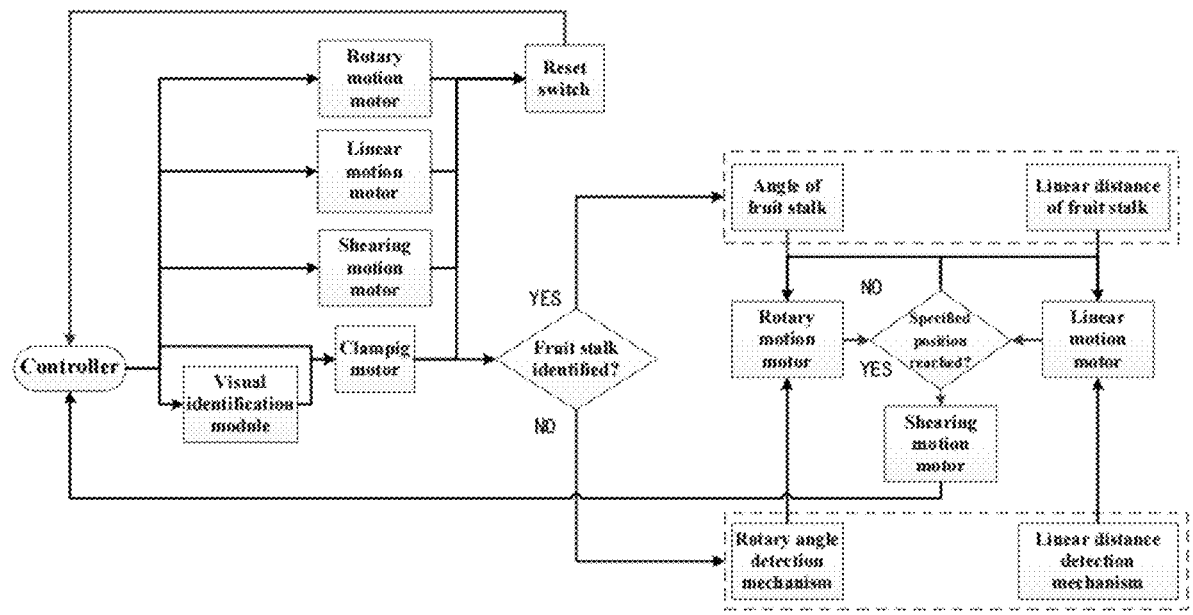
FIG. 9 is a schematic diagram of a control system according to the present invention.
Figure 10:
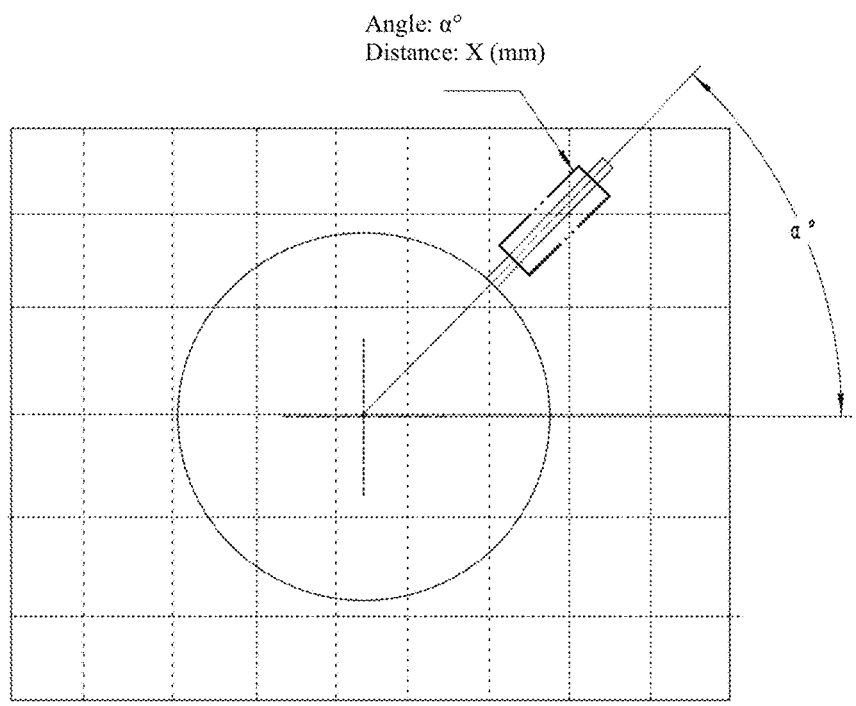
FIG. 10 is a schematic diagram of identification and positioning of the present invention.

Referring to FIGS. 6 to 8, the linear motion mechanism is installed on a rotary platform 312, the linear motion mechanism includes: a linear motion motor 601, a linear motion motor fixing seat 602, a linear motion guide rail 603, a linear motion nut 604, a linear push rod 605, a linear motion platform 606, a linear motion sliding block 607, and a linear motion bearing seat 608, the linear motion motor 601 is installed on the rotary platform 312 by a linear motion motor fixing seat 602, a first screw rod is connected to an output shaft of the linear motion motor 601, the other end of the first screw rod is connected to the linear motion bearing seat 608, the linear motion nut 604 is in threaded connection with the first screw rod, the linear push rod 605 is connected to the linear motion nut 604 by a bolt, the linear motion guide rail 603 is installed in a middle portion of the rotary platform 312, and the linear motion platform 606 is slidably installed on the linear motion guide rail 603 by the linear motion sliding block 607. The linear motion nut 604 is in threaded connection with the first screw rod, so that the rotary motion of the linear motion motor 601 can be converted into a linear motion. When the angle detection of fruit stalks is completed, the rotary platform 312 reaches a to-be-sheared position, the linear motion motor 601 rotates, the linear push rod 605 moves forwards towards the fruit direction in the rotation direction, the linear push rod 605 pushes the linear motion platform 606, the shearing motion mechanism and the linear distance detection mechanism are carried on the linear motion platform 606, in a case that the linear distance of the fruit stalks cannot be obtained through machine vision identification due to serious blocking, the linear motion platform 606 reaches a specified position by cooperating with the linear distance detection mechanism; and in a case that the linear distance of the fruit stalks can be obtained through machine vision, the linear motion motor 601 is driven by the controller, so that the linear motion platform 606 directly reaches a specified position.

As a preferred embodiment, the shearing motion mechanism is installed at a rear end of the linear motion platform 606, the shearing motion mechanism includes: a shearing motion motor 701, a shearing motion guide rod 702, a shearing motion sliding block 703, a shearing motion bearing seat 707, and a boosting shearing mechanism, the shearing motion motor 701 is installed on the linear motion platform 606, a second screw rod is connected to an output shaft of the shearing motion motor 701, the shearing motion sliding block 703 is in threaded connection with the second screw rod, the shearing motion bearing seat 707 is connected to the other end of the second screw rod, the shearing motion guide rod 702 is installed on two sides of the second screw rod, and the shearing motion sliding block 703 is connected to the shearing motion guide rods 702 at two sides in a sliding manner; and the boosting shearing mechanism includes: a first connecting rod 704, a second connecting rod 705, a third connecting rod 706, a fixed blade 708, a movable blade 709, a movable blade sliding block 710, a movable blade guide rail 711, and a connecting rod fixing column 712, one end of the first connecting rod 704 is hinged to the shearing motion sliding block 703, the other end of the first connecting rod is hinged to the second connecting rod 705, the other end of the second connecting rod 705 is hinged to the connecting rod fixing column 712, the connecting rod fixing column 712 is installed on the linear motion platform 606, a middle portion of the second connecting rod 705 is hinged to the third connecting rod 706, the other end of the third connecting rod 706 is hinged to the movable blade 709, the fixed blade 708 is installed at a position that is at the forefront of the linear motion platform 606 and that is close to a fruit, the movable blade guide rail 711 is transversely installed at a front end of the linear motion platform 606, and the movable blade 709 is connected to the movable blade guide rail 711 in a sliding manner by the movable blade sliding block 710.

The first connecting rod 704, the second connecting rod 705, the third connecting rod 706, and the connecting rod fixing column 712 form a boosting structure, so that the thrust generated by the shearing motion sliding block 703 can be converted into a shearing force with a larger value and generated by the movable blade 709 and the fixed blade 708, so that the effect of increasing the transmission ratio is achieved, the fruit stalks are sheared more stably, and the input power is reduced; in addition, the overall size of the shearing mechanism is reduced, and the end effector is more flexible and reliable. When the linear distance detection and the rotary angle detection are completed, the rotary platform 312 and the linear moving platform 606 reach the specified positions, the shearing motion mechanism reaches a to-be-sheared position at this time, the shearing motion motor 701 rotates to enable the shearing motion sliding block 703 to push the connecting rod in the boosting shearing mechanism along the shearing motion guide rod 702 towards the fruit direction, the connecting rod is compressed, the movable blade 709 moves along the movable blade guide rail 711 until the fruit shearing is completed, and the shearing motion motor 701 stops moving, so that the fruit stalk shearing action is completed, the picking end effector moves to the fruit basket position by the mechanical arm, and the clamping motion mechanism releases the fruit to complete one-round picking.

In a preferred embodiment, the linear distance detection mechanism is arranged in front of the linear motion platform 606 and close to a direction of a fruit, the linear distance detection mechanism includes: a distance detection push rod 801, a linear detection fixing seat 802, and a distance limit switch 803, the distance detection push rod 801 is arranged below the fixed blade 708 and is connected to the linear detection fixing seat 802, a cylindrical guide rod and a compression spring are arranged on the distance detection push rod 801, the distance detection push rod 801 can move linearly along the cylindrical guide rod, the linear detection fixing seat 802 is arranged on the linear motion platform 606 and is positioned between the distance detection push rod 801 and the shearing motion bearing seat 707, and the distance limit switch 803 is arranged on the linear detection fixing seat 802 and is installed at a position of the cylindrical guide rod on the distance detection push rod 801. When the linear platform 606 moves towards the fruit direction, the distance detection push rod 801 moves along with the linear platform 606 under the action of the elastic force of the compression spring until the fruit stalk touches the fruit, the fruit stalk can generate a reacting force on the distance detection push rod 801, the compression spring is compressed, the distance detection push rod 801 can generate linear motion opposite to the fruit direction until the distance limit switch 803 is touched, the linear motion motor 601 stops moving, and the mechanical detection of the linear distance in the cylindrical coordinate of the fruit stalk is completed.

Embodiment 2

Referring to FIGS. 1 to 10, the present invention provides a use method for a cylindrical coordinate shearing type fruit picking end effector, which includes the following steps:

S1: before picking a fruit, the control system firstly controls the motors on each mechanism to reset by a controller, when a reset switch is touched, the motors are restored to the initial positions, the initial states of the motors are that the clamping motor 201 enables a distance between the flexible fingers 207 to be the largest, the rotary motion motor 301 enables the rotary platform 312 to be at the leftmost position, the linear motion motor 601 enables the linear motion platform 606 to be far away from the direction of the fruit, and the shearing motion motor 701 enables the movable blade 709 to be overlapped with a cutting edge of the fixed blade 708; further, a visual identification module is used to recognize the fruits and give the position information of the to-be picked fruit;

S2: when a position of a fruit is known, a mechanical arm moves to enable the picking end effector to reach a position near a to-be-picked fruit, and the fruit protection finger 5 separates the to-be-picked fruit from other overlapped fruits, so that interference of other fruits and fruit stalks on mechanical detection is avoided; the clamping motor 201 rotates, the flexible finger 207 linearly moves along the guide optical axis 210 along with the finger clamping nut 204 and the finger guide block 209, and a rotation direction of the clamping motor 201 should enable a distance of the flexible finger 207 to close; when the flexible finger touches a surface of the fruit, a pressure value is generated on the thin-film pressure sensor on the flexible finger 207, the pressure value of the thin-film pressure sensor reaches a safety threshold value as the distance of the flexible finger 207 is further shortened, and in this case, the clamping motor 201 stops rotating, and the fruit clamping action is completed;

S3: when a position of a fruit stalk cannot be identified visually due to the blocking of fruits and leaves, operations of the rotary angle detection mechanism and the linear distance detection mechanism are required, after the fruit clamping is completed, the rotary motion motor 301 rotates from left to right, the rotary platform 312 and the rotary motion motor 301 coaxially rotate along the arc-shaped guide rail 307, and when the fruit stalk is touched, and the angle detection rod 402 rotates opposite to a rotation direction of the rotary motion motor 301 due to the compression of a torsion spring under the action of a contact force, so that the angle limit switch 403 is triggered, the rotary motion motor 301 stops moving, and the angle detection of the fruit stalk is completed;

when the angle detection is completed, the linear motion motor 601 rotates to drive the linear push rod 605 to push the linear motion platform 606 to move linearly towards a fruit motion direction along the linear motion guide rail 603; when the distance detection push rod 801 touches the fruit stalk, the distance detection push rod 801 compresses a compression spring under the action of a contact force, and thus the distance detection push rod 801 moves towards an opposite direction of the fruit along the cylindrical guide rod on the distance detection push rod, so that the distance limit switch 803 is triggered, the linear motion motor 601 stops moving, and the distance detection of the fruit stalk is completed;

S4: when the cylindrical coordinate fruit stalk positioning based on the rotary angle and the linear distance detection is completed, the rotary platform 312 and the linear motion platform 606 reach a to-be-sheared position; in this case, the shearing motion motor 701 rotates to drive the shearing motion sliding block 703 to move linearly towards the fruit direction along the shearing motion guide rod 702; the second connecting rod 705 in the boosting shearing mechanism pushes the movable blade 709 to move linearly towards a closing direction of the blade along the movable blade guide rail 711, so that the shearing of the fruit stalk is completed; and S5: when the shearing of the fruit stalk is completed, the picking end effector moves to a position of a fruit basket by the mechanical arm, and the clamping motor 201 rotates, so that the flexible finger 207 is opened, a fruit is released, and the undamaged fruit picking is completed.

In the description of the present application, it should be noted that directions or positional relationships indicated by terms such as "upper", "lower" and the like are those shown based on the accompanying drawings, are merely intended to facilitate and simplify description rather than to indicate or imply that the indicated device or element must have a specific direction and be structured and operated according to the specific direction, and should not be construed as limiting the present application. Unless otherwise clearly specified and defined, the terms "mount", "interconnect", and "connect" should be understood in their broad sense. For example, the terms may be "fixedly connect", "detachably connect" or "integrally connect"; "mechanically connect" and "electrically connect"; or "directly interconnect", "indirectly interconnect through an intermediate" or "the communication between the interiors of two elements". Those of ordinary skill in the art may understand specific meanings of the foregoing terms in the present application according to specific cases.

It should be noted that, in the present application, relational terms such as "first" and "second" are merely used to distinguish one entity or operation from another entity or operation without necessarily requiring or implying any actual relationship or order between such entities or operations. Moreover, terms "include", "comprise", or any other variants thereof are intended to cover a non-exclusive inclusion, so that a process, a method, an article, or a device that includes a list of elements includes those elements, and also includes other elements which are not expressly listed, or further includes elements inherent to this process, method, article, or device. Without further limitation, an element defined by the phrase "including a/an . . . " does not exclude the presence of another identical elements in the process, method, article or device that includes the element.

The above description is only specific embodiments of the present application to enable those skilled in the art to understand or implement the present application. Various modifications to these embodiments will be apparent to those skilled in the art, and the generic principles defined herein may be implemented in other embodiments without departing from the spirit or scope of the present application. Thus, the present application is limited to these embodiments shown herein, but accords with the broadest scope consistent with the principles and novel features disclosed herein.

What is claimed is:

1. A cylindrical coordinate shearing type fruit picking end effector, comprising: a rack, a fruit clamping mechanism, a rotary motion mechanism, a rotary angle detection mechanism, a linear motion mechanism, a shearing motion mechanism, and a linear distance detection mechanism; wherein
    the linear distance detection mechanism is arranged at a front end of the linear motion mechanism and is configured to detect a position between the shearing motion mechanism and a fruit stalk;
    the shearing motion mechanism is arranged at a rear end of the linear motion mechanism and is configured to shear the fruit stalk;
    the linear motion mechanism is arranged at a top end of the rotary motion mechanism and is configured to adjust the distance between the shearing motion mechanism and the fruit stalk;
    the rotary motion mechanism is arranged at a rear end of the rack and is configured to adjust an angle of the shearing motion mechanism;
    the rotary angle detection mechanism is arranged at a front end of the rotary motion mechanism and is configured to detect an angle of the fruit stalk; and
    the fruit clamping mechanism is arranged at a front end of the rack and is configured to clamp and fix a position of a fruit.

2. The cylindrical coordinate shearing type fruit picking end effector according to claim 1, wherein fruit protection fingers are further arranged at two sides of the rack adjacent to a rear end of the fruit clamping mechanism, and the fruit protection fingers are configured to avoid a difficult clamping caused by a fruit overlapping.

3. The cylindrical coordinate shearing type fruit picking end effector according to claim 1, wherein the fruit clamping mechanism comprises: a clamping motor, a clamping motor fixing seat, a finger coupler, two finger clamping nuts, a bidirectional screw, a clamping bearing seat, a flexible finger, an optical axis fixing seat, a finger guide block, and a guide optical axis;
    the clamping motor is fixedly connected to the rack by the clamping motor fixing seat, a first end of the bidirectional screw is in a transmission connection with an output shaft of the clamping motor by the finger coupler, a second end of the bidirectional screw is rotatably connected to the clamping bearing seat, the two finger clamping nuts are symmetrically screwed at two ends of the bidirectional screw, the flexible finger is fixed at a front end of each of the two finger clamping nuts, the optical axis fixing seat is fixed at a bottom end of the rack, and the two finger clamping nuts are connected to the guide optical axis in a sliding mode by the finger guide block.

4. The cylindrical coordinate shearing type fruit picking end effector according to claim 3, wherein the flexible finger is provided with a thin-film pressure sensor, and the thin-film pressure sensor is configured to ensure an undamaged fruit picking.

5. The cylindrical coordinate shearing type fruit picking end effector according to claim 1, wherein the rotary motion mechanism comprises: a rotary motion motor, a rotary motor fixing seat, a rotary coupler, a swing rod, a rotary shaft, an arc-shaped guide rail fixing seat, an arc-shaped guide rail, a rotary motion bearing seat, a rolling shaft, a roller bearing, a swing connecting rod, and a rotary platform;

the rotary motion motor is connected to the rack by the rotary motor fixing seat, a first end of the rotary shaft is connected to an output shaft of the rotary motion motor by the rotary coupler, a second end of the rotary shaft is connected to the rotary motion bearing seat, the swing rod is arranged at the first end of the rotary shaft adjacent to the rotary coupler, the swing connecting rod is connected to the swing rod in a sliding manner, the rotary platform is fixed on the swing connecting rod, the arc-shaped guide rail is connected to the rack by the arc-shaped guide rail fixing seat, and the rotary platform is movably connected onto the arc-shaped guide rail by the rolling shaft provided with the roller bearing.

6. The cylindrical coordinate shearing type fruit picking end effector according to claim 5, wherein the rotary angle detection mechanism is installed in front of the rotary motion bearing seat, the rotary angle detection mechanism comprises: a rotation detection connecting block, an angle detection rod, and an angle limit switch, the rotation detection connecting block is fixedly connected to the rotary shaft, the rotation detection connecting block and the angle detection rod are provided with linear grooves for fixing a torsion spring, and the angle limit switch is installed on the rotation detection connecting block.

7. The cylindrical coordinate shearing type fruit picking end effector according to claim 5, wherein the linear motion mechanism is installed on the rotary platform, the linear motion mechanism comprises: a linear motion motor, a linear motion motor fixing seat, a linear motion guide rail, a linear motion nut, a linear push rod, a linear motion platform, a linear motion sliding block, and a linear motion bearing seat, the linear motion motor is installed on the rotary platform by the linear motion motor fixing seat, a first end of a first screw rod is connected to an output shaft of the linear motion motor, a second end of the first screw rod is connected to the linear motion bearing seat, the linear motion nut is in threaded connection with the first screw rod, the linear push rod is connected to the linear motion nut by a bolt, the linear motion guide rail is installed in a middle portion of the rotary platform, and the linear motion platform is slidably installed on the linear motion guide rail by the linear motion sliding block.

8. The cylindrical coordinate shearing type fruit picking end effector according to claim 7, wherein the shearing motion mechanism is installed at a rear end of the linear motion platform, the shearing motion mechanism comprises: a shearing motion motor, a shearing motion guide rod, a shearing motion sliding block, a shearing motion bearing seat, and a boosting shearing mechanism, the shearing motion motor is installed on the linear motion platform, a first end of a second screw rod is connected to an output shaft of the shearing motion motor, the shearing motion sliding block is in threaded connection with the second screw rod, the shearing motion bearing seat is connected to a second end of the second screw rod, the shearing motion guide rod is installed on two sides of the second screw rod, and the shearing motion sliding block is connected to the shearing motion guide rods at two sides in a sliding manner; and the boosting shearing mechanism comprises: a first connecting rod, a second connecting rod, a third connecting rod, a fixed blade, a movable blade, a movable blade sliding block, a movable blade guide rail, and a connecting rod fixing column, a first end of the first connecting rod is hinged to the shearing motion sliding block, a second end of the first connecting rod is hinged to a first end of the second connecting rod, a second end of the second connecting rod is hinged to the connecting rod fixing column, the connecting rod fixing column is installed on the linear motion platform, a middle portion of the second connecting rod is hinged to a first end of the third connecting rod, a second end of the third connecting rod is hinged to the movable blade, the fixed blade is installed at a position at a forefront of the linear motion platform and adjacent to the fruit, the movable blade guide rail is transversely installed at a front end of the linear motion platform, and the movable blade is connected to the movable blade guide rail in a sliding manner by the movable blade sliding block.

9. The cylindrical coordinate shearing type fruit picking end effector according to claim 8, wherein the linear distance detection mechanism is arranged in front of the linear motion platform and adjacent to a direction of the fruit, the linear distance detection mechanism comprises: a distance detection push rod, a linear detection fixing seat, and a distance limit switch, the distance detection push rod is arranged below the fixed blade and is connected to the linear detection fixing seat, a cylindrical guide rod and a compression spring are arranged on the distance detection push rod, the distance detection push rod is allowed to move linearly along the cylindrical guide rod, the linear detection fixing seat is arranged on the linear motion platform and is positioned between the distance detection push rod and the shearing motion bearing seat, and the distance limit switch is arranged on the linear detection fixing seat and is installed at a position of the cylindrical guide rod on the distance detection push rod.

10. A use method for the cylindrical coordinate shearing type fruit picking end effector according to claim 1, comprising the following steps:

S1: the cylindrical coordinate shearing type fruit picking end effector is debugged to an initial state;

S2: when the position of the fruit is known, a mechanical arm moves to allow the cylindrical coordinate shearing type fruit picking end effector to reach a position adjacent to a to-be-picked fruit, and a fruit protection finger separates the to-be-picked fruit from other overlapped fruits to avoid an interference of other fruits and fruit stalks on a mechanical detection; a clamping motor rotates, a flexible finger linearly moves along a guide optical axis along with two finger clamping nuts and a finger guide block, and a rotation direction of the clamping motor is configured to allow a distance of the flexible finger to close; when the flexible finger touches a surface of the fruit, a pressure value is generated on a thin-film pressure sensor on the flexible finger, the pressure value of the thin-film pressure sensor reaches a safety threshold value as the distance of the flexible finger is further shortened, and in this case, the clamping motor stops rotating, and a fruit clamping action is completed;

S3: when a position of the fruit stalk is not allowed to be identified visually due to a blocking of fruits and leaves, operations of the rotary angle detection mechanism and the linear distance detection mechanism are required, after the fruit clamping action is completed, a rotary motion motor rotates from a left to a right, a rotary platform and the rotary motion motor coaxially rotate along an arc-shaped guide rail, and when the fruit stalk is touched, and an angle detection rod rotates in a direction opposite to a rotation direction of the rotary motion motor due to a compression of a torsion spring under an action of a contact force, wherein an angle limit switch is triggered, the rotary motion motor stops moving, and an angle detection of the fruit stalk is completed;

when the angle detection is completed, a linear motion motor rotates to drive a linear push rod to push a linear motion platform to move linearly towards a fruit motion direction along a linear motion guide rail; when a distance detection push rod touches the fruit stalk, the distance detection push rod compresses a compression spring under an action of a contact force, and thus the distance detection push rod moves towards an opposite direction of the fruit along a cylindrical guide rod on the distance detection push rod, wherein a distance limit switch is triggered, the linear motion motor stops moving, and a linear distance detection of the fruit stalk is completed;

S4: when a cylindrical coordinate fruit stalk positioning based on a rotary angle and the linear distance detection is completed, the rotary platform and the linear motion platform reach a to-be-sheared position; in this case, a shearing motion motor rotates to drive a shearing motion sliding block to move linearly towards a fruit direction along a shearing motion guide rod; a second connecting rod in a boosting shearing mechanism pushes a movable blade to move linearly towards a closing direction of a blade along a movable blade guide rail, and a shearing of the fruit stalk is completed; and S5: when the shearing of the fruit stalk is completed, the cylindrical coordinate shearing type fruit picking end effector moves to a position of a fruit basket by the mechanical arm, and the clamping motor rotates, wherein a flexible finger is opened, the fruit is released, and an undamaged fruit picking is completed.

11. The use method for the cylindrical coordinate shearing type fruit picking end effector according to claim 10, wherein in the cylindrical coordinate shearing type fruit picking end effector, fruit protection fingers are further arranged at two sides of the rack adjacent to a rear end of the fruit clamping mechanism, and the fruit protection fingers are configured to avoid a difficult clamping caused by a fruit overlapping.

12. The use method for the cylindrical coordinate shearing type fruit picking end effector according to claim 10, wherein in the cylindrical coordinate shearing type fruit picking end effector, the fruit clamping mechanism comprises: the clamping motor, a clamping motor fixing seat, a finger coupler, the two finger clamping nuts, a bidirectional screw, a clamping bearing seat, the flexible finger, an optical axis fixing seat, the finger guide block, and the guide optical axis; the clamping motor is fixedly connected to the rack by the clamping motor fixing seat, a first end of the bidirectional screw is in a transmission connection with an output shaft of the clamping motor by the finger coupler, a second end of the bidirectional screw is rotatably connected to the clamping bearing seat, the two finger clamping nuts are symmetrically screwed at two ends of the bidirectional screw, the flexible finger is fixed at a front end of each of the two finger clamping nuts, the optical axis fixing seat is fixed at a bottom end of the rack, and the two finger clamping nuts are connected to the guide optical axis in a sliding mode by the finger guide block.

13. The use method for the cylindrical coordinate shearing type fruit picking end effector according to claim 12, wherein in the cylindrical coordinate shearing type fruit picking end effector, the flexible finger is provided with the thin-film pressure sensor, and the thin-film pressure sensor is configured to ensure the undamaged fruit picking.

14. The use method for the cylindrical coordinate shearing type fruit picking end effector according to claim 10, wherein in the cylindrical coordinate shearing type fruit picking end effector, the rotary motion mechanism comprises: the rotary motion motor, a rotary motor fixing seat, a rotary coupler, a swing rod, a rotary shaft, an arc-shaped guide rail fixing seat, the arc-shaped guide rail, a rotary motion bearing seat, a rolling shaft, a roller bearing, a swing connecting rod, and the rotary platform; the rotary motion motor is connected to the rack by the rotary motor fixing seat, a first end of the rotary shaft is connected to an output shaft of the rotary motion motor by the rotary coupler, a second end of the rotary shaft is connected to the rotary motion bearing seat, the swing rod is arranged at the first end of the rotary shaft adjacent to the rotary coupler, the swing connecting rod is connected to the swing rod in a sliding manner, the rotary platform is fixed on the swing connecting rod, the arc-shaped guide rail is connected to the rack by the arc-shaped guide rail fixing seat, and the rotary platform is movably connected onto the arc-shaped guide rail by the rolling shaft provided with the roller bearing.

15. The use method for the cylindrical coordinate shearing type fruit picking end effector according to claim 14, wherein in the cylindrical coordinate shearing type fruit picking end effector, the rotary angle detection mechanism is installed in front of the rotary motion bearing seat, the rotary angle detection mechanism comprises: a rotation detection connecting block, the angle detection rod, and the angle limit switch, the rotation detection connecting block is fixedly connected to the rotating shaft, the rotation detection connecting block and the angle detection rod are provided with linear grooves for fixing the torsion spring, and the angle limit switch is installed on the rotation detection connecting block.

16. The use method for the cylindrical coordinate shearing type fruit picking end effector according to claim 14, wherein in the cylindrical coordinate shearing type fruit picking end effector, the linear motion mechanism is installed on the rotary platform, the linear motion mechanism comprises: the linear motion motor, a linear motion motor fixing seat, the linear motion guide rail, a linear motion nut, the linear push rod, the linear motion platform, a linear motion sliding block, and a linear motion bearing seat, the linear motion motor is installed on the rotary platform by the linear motion motor fixing seat, a first end of a first screw rod is connected to an output shaft of the linear motion motor, a second end of the first screw rod is connected to the linear motion bearing seat, the linear motion nut is in threaded connection with the first screw rod, the linear push rod is connected to the linear motion nut by a bolt, the linear motion guide rail is installed in a middle portion of the rotary platform, and the linear motion platform is slidably installed on the linear motion guide rail by the linear motion sliding block.

17. The use method for the cylindrical coordinate shearing type fruit picking end effector according to claim 16, wherein in the cylindrical coordinate shearing type fruit picking end effector, the shearing motion mechanism is installed at a rear end of the linear motion platform, the shearing motion mechanism comprises: the shearing motion motor, the shearing motion guide rod, the shearing motion sliding block, a shearing motion bearing seat, and the boosting shearing mechanism, the shearing motion motor is installed on the linear motion platform, a first end of a second screw rod is connected to an output shaft of the shearing motion motor, the shearing motion sliding block is in threaded connection with the second screw rod, the shearing motion bearing seat is connected to a second end of the second screw rod, the shearing motion guide rod is installed on two sides of the second screw rod, and the shearing motion sliding block is connected to the shearing motion guide rods at two sides in a sliding manner; and the boosting shearing mechanism comprises: a first connecting rod, a second connecting rod, a third connecting rod, a fixed blade, the movable blade, a movable blade sliding block, the movable blade guide rail, and a connecting rod fixing column, a first end of the first connecting rod is hinged to the shearing motion sliding block, a second end of the first connecting rod is hinged to a first end of the second connecting rod, a second end of the second connecting rod is hinged to the connecting rod fixing column, the connecting rod fixing column is installed on the linear motion platform, a middle portion of the second connecting rod is hinged to a first end of the third connecting rod, a second end of the third connecting rod is hinged to the movable blade, the fixed blade is installed at a position at a forefront of the linear motion platform and adjacent to the fruit, the movable blade guide rail is transversely installed at a front end of the linear motion platform, and the movable blade is connected to the movable blade guide rail in a sliding manner by the movable blade sliding block.

18. The use method for the cylindrical coordinate shearing type fruit picking end effector according to claim 17, wherein in the cylindrical coordinate shearing type fruit picking end effector, the linear distance detection mechanism is arranged in front of the linear motion platform and adjacent to a direction of the fruit, the linear distance detection mechanism comprises: the distance detection push rod, a linear detection fixing seat, and the distance limit switch, the distance detection push rod is arranged below the fixed blade and is connected to the linear detection fixing seat, the cylindrical guide rod and the compression spring are arranged on the distance detection push rod, the distance detection push rod is allowed to move linearly along the cylindrical guide rod, the linear detection fixing seat is arranged on the linear motion platform and is positioned between the distance detection push rod and the shearing motion bearing seat, and the distance limit switch is arranged on the linear detection fixing seat and is installed at a position of the cylindrical guide rod on the distance detection push rod.

\* \* \* \* \*